United States Patent
Panferov

(10) Patent No.: US 11,926,569 B2
(45) Date of Patent: Mar. 12, 2024

(54) COMPOSITE CELLULOSIC PRODUCTS AND PROCESSES FOR MAKING AND USING SAME

(71) Applicant: SIERRACRETE LLC, Simi Valley, CA (US)

(72) Inventor: Evgeny Panferov, Simi Valley, CA (US)

(73) Assignee: SIERRACRETE LLC, Simi Valley, CA (US)

( * ) Notice: Subject to any disclaimer, the term of this patent is extended or adjusted under 35 U.S.C. 154(b) by 0 days.

(21) Appl. No.: 18/357,661

(22) Filed: Jul. 24, 2023

(65) Prior Publication Data

US 2023/0365469 A1    Nov. 16, 2023

Related U.S. Application Data

(63) Continuation of application No. PCT/US2022/080606, filed on Nov. 29, 2022.

(60) Provisional application No. 63/284,137, filed on Nov. 30, 2021.

(51) Int. Cl.
*C04B 28/32* (2006.01)
*B27N 1/02* (2006.01)
*B27N 3/00* (2006.01)
*C04B 26/06* (2006.01)
*C04B 26/28* (2006.01)

(52) U.S. Cl.
CPC ............... *C04B 28/32* (2013.01); *B27N 1/02* (2013.01); *B27N 3/002* (2013.01); *C04B 26/06* (2013.01); *C04B 26/28* (2013.01)

(58) Field of Classification Search
CPC .......... B27N 1/02; B27N 3/002; C04B 28/32; C04B 26/06; C04B 26/28
See application file for complete search history.

(56) References Cited

U.S. PATENT DOCUMENTS

| | | | |
|---|---|---|---|
| 4,572,862 | A | 2/1986 | Ellis |
| 2015/0151499 | A1 | 6/2015 | Birkeland et al. |
| 2015/0314564 | A1 | 11/2015 | Mancini et al. |
| 2023/0047741 | A1 | 2/2023 | Wambaugh et al. |

FOREIGN PATENT DOCUMENTS

| | | | |
|---|---|---|---|
| CN | 105645911 A | * | 6/2016 |
| CN | 105731987 A | * | 7/2016 |
| CN | 107127841 B | | 4/2020 |

OTHER PUBLICATIONS

Cui, Meng, et al., "Study on the Properties and Mechanism of Magnesium Oxychloride Adhesive Particleboard Modified by Fly Ash", Materials, vol. 15, No. 8, Apr. 13, 2022, p. 2845, https://doi.org/10.3390/ma15082845.

Huang, Qing, et al., "Effects of Fly Ash, Phosphoric Acid, and Nano-Silica on the Properties of Magnesium Oxychloride Cement", Ceramics International, vol. 47, No. 24, Dec. 15, 2021, pp. 34341-34351, https://doi.org/10.1016/j.ceramint.2021.08.347.

Jin, Shicun, et al., "A Low-Cost, Formaldehyde-Free and High Flame Retardancy Wood Adhesive from Inorganic Adhesives: Properties and Performance", Polymers, vol. 9, No. 12, Oct. 16, 2017, p. 513, https://doi.org/10.3390/polym9100513.

Maier, Andreea, et al., "Perspective of Using Magnesium Oxychloride Cement (MOC) and Wood as a Composite Building Material: A Bibliometric Literature Review", Materials, vol. 15, No. 5, Feb. 26, 2022, p. 1772, https://doi.org/10.3390/ma15051772.

Na, Bin, et al., "Influence of Wet and Dry Cycle on Properties of Magnesia-Bonded Wood-Wool Panel", Wood Research, vol. 65, No. 2, Apr. 30, 2020, pp. 271-282, https://doi.org/10.37763/wr.1336-4561/65.2.271282.

Qu, Z.Y., et al., "Super-Hydrophobic Magnesium Oxychloride Cement (MOC): From Structural Control to Self-Cleaning Property Evaluation", Materials and Structures, vol. 53, Mar. 6, 2020, https://doi.org/10.1617/s11527-020-01462-3.

Rode, Carsten, et al., "Moisture Damage with Magnesium Oxide Boards in Danish Facade Structures", Energy Procedia, vol. 132, Oct. 2017, pp. 765-770, https://doi.org/10.1016/j.egypro.2017.10.025.

Wang, Lei, et al., "Upcycling Wood Waste into Fibre-Reinforced Magnesium Phosphate Cement Particleboards", Construction and Building Materials, vol. 159, Jan. 20, 2018, pp. 54-63, https://doi.org/10.1016/j.conbuildmat.2017.10.107.

Zhou, Wenguang, et al., "A Strong Magnesium Oxychloride Cement Wood Adhesive via Organic-Inorganic Hybrid", Construction and Building Materials, vol. 297, Aug. 23, 2021, p. 123776, https://doi.org/10.1016/j.conbuildmat.2021.123776.

Shalbafan, Ali, et al., "Development of Mineral-Bonded Plywood with Magnesium Oxychloride as a Binder Using the Hot-Pressing Process", Polymers 2023, 15, 805, https://doi.org/10.3390/polym15040805.

Database WPI, Week 201772, Thomson Scientific, London, GB; AN 2017-63262Y, XP002809346, Sep. 5, 2017, abstract.

International Search Report and Written Opinion for International Application No. PCT/US2022/080606 dated Sep. 24, 2023.

* cited by examiner

*Primary Examiner* — Anthony J Green

(74) *Attorney, Agent, or Firm* — Edmonds & Cmaidalka, P.C.

(57) ABSTRACT

Composite cellulosic products and processes for making same. In some embodiments, the composite cellulosic product can include a plurality of cellulosic substrates and an at least partially cured binder. Prior to curing, the binder can include a mixture formed by combining magnesium oxide, water, and magnesium chloride. A weight ratio of the magnesium oxide to the magnesium chloride in the binder can be at least 2.2:1 to 8.5:1.

20 Claims, No Drawings

COMPOSITE CELLULOSIC PRODUCTS AND PROCESSES FOR MAKING AND USING SAME

CROSS-REFERENCE TO RELATED APPLICATIONS

This application is a continuation of co-pending International Application No. PCT/US2022/080606, filed on Nov. 29, 2022, and published as WO 2023/102394 A2, which claims priority to U.S. Provisional Patent Application No. 63/284,137, filed on Nov. 30, 2021, which are both incorporated by reference herein.

STATEMENT REGARDING GOVERNMENT CONTRACTS

This invention was made with State of California support under California Energy Commission agreement number 300-15-007. The Energy Commission has certain rights to this invention.

FIELD

Embodiments described generally relate to composite cellulosic products and processes for making same.

BACKGROUND

Composite cellulosic products can include, e.g., boards, beams, posts, plywood, oriented strand board, and sheathing, for both structural and non-structural purposes. Composite cellulosic products beneficially take carbon, which was removed from the atmosphere when the plant the cellulosic material was derived from was growing, and maintain that carbon sequestered from the atmosphere. Thus, composite cellulosic products have the potential to be carbon neutral or nearly carbon neutral.

Composite cellulosic products are commonly formed as plywood or in other sheets such as oriented strand board (OSB), particleboard, or in other planar sheet formats. When composite cellulosic products are provided in planar sheets, a manufacturing process is involved which generally involves smaller pieces of cellulosic material, such as flakes, strands, sawdust, or thin layers peeled from a log (in the case of plies within plywood) that are bonded together to form the final composite cellulosic product. There are a number of conventional binders that can be used to bond the pieces of cellulosic material such as a polyisocyanate resin, a polyurea resin, a formaldehyde-based resin, e.g., urea-formaldehyde or phenol-formaldehyde resins, and the like.

While the conventional binders are generally effective in meeting many of the goals for the composite cellulosic product, the conventional binders have some drawbacks. For example, such binders are often, at least to some degree, volatile in nature, and can emit volatile organic compounds (VOCs) over time after manufacture of the composite cellulosic product. Another drawback of composite cellulosic products is the relative flammability of such products. When buildings are constructed utilizing composite cellulosic products, a risk of damage or loss due to fire is introduced. Similarly, the conventional binders are typically chemicals that are also combustible. As such, the conventional binders do not act appreciably to decrease flammability of such composite cellulosic products and can actually add to the flammability of the material.

There is a need, therefore, for improved binders that can be used to make composite cellulosic products, composite cellulosic products made with such binders, and processes for making same.

SUMMARY

Composite cellulosic products and processes for making same are provided. In some embodiments, the composite cellulosic product can include a plurality of cellulosic substrates and an at least partially cured binder. Prior to curing, the binder can include a mixture formed by combining magnesium oxide, water, and magnesium chloride. A weight ratio of the magnesium oxide to the magnesium chloride in the binder can be at least 2.2:1 to 8.5:1.

In some embodiments, the process for making a composite cellulosic product can include coating a plurality of cellulosic substrates with a binder to produce a mixture. The binder can include magnesium oxide, water, and magnesium chloride. A weight ratio of the magnesium oxide to the magnesium chloride in the binder can be at least 2.2:1 to 8.5:1. The process can also include allowing the mixture to set for a time period sufficient to allow the binder to at least partially cure to produce the composite cellulosic product.

DETAILED DESCRIPTION

Composite cellulosic products and processes for making and using same are provided. The composite cellulosic products can be or can include, but is not limited to, at least two constituents or components including a plurality of cellulosic substrates and an at least partially cured binder. In some embodiments, the binder, prior to curing, can be or can include, but is not limited to, a mixture formed by combining magnesium oxide or first constituent, water or second constituent, and a third constituent that can be or can include, but is not limited to, magnesium chloride, a phosphate-containing material, a silica-containing material, a silica/alumina-containing material, or a mixture thereof.

In some embodiments, the magnesium oxide can be or can include calcined magnesium oxide, which can also be referred to as light-burnt magnesium oxide or light-burnt magnesia. In some embodiments, the magnesium oxide can be obtained by calcining magnesite and/or magnesium hydroxide. The magnesium oxide has CAS No. 1309-48-4. In some embodiments, the water can be or can include, but is not limited to, tap water, distilled water, deionized water, or a mixture thereof. It is noted that when water and magnesium oxide are brought together, magnesium hydroxide can be formed, which is a base with a pH of up to about 10.35. As such, the third constituent can have a pH greater than seven when in the presence of water but the pH of the third constituent, but relative to the magnesium oxide in water can be more acidic.

In some embodiments, when the binder includes magnesium chloride, the magnesium chloride can be anhydrous magnesium chloride having a chemical formula of $MgCl_2$, one or more hydrates of magnesium chloride having a chemical formula of $MgCl_2 \cdot nH_2O$, where n can be 1, 2, 4, or 6, or a mixture thereof. In some embodiments, when the binder includes the magnesium chloride, at least a portion of the magnesium chloride can be in the form of magnesium chloride monohydrate, magnesium chloride dihydrate, magnesium chloride tetrahydrate, magnesium chloride hexahydrate, or a mixture thereof.

In some embodiments, a weight ratio of the magnesium oxide to the magnesium chloride in the binder can be 0.8:1, 1:1, 1.2:1, 1.4:1, 1.6:1, 1.8:1, 2:1, 2.2:1, 2.25:1, 2.3:1, 2.35:1, 2.4:1, 2.45:1, 2.5:1, 2.55:1, 2.6:1, 2.7:1, 2.8:1, or 2.9:1, 3:1, 3.1:1, 3.2:1, 3.3:1, 3.4:1, or 3.5:1 to 3.6:1, 3.7:1, 3.8:1, 3.9:1, 4:1, 4.1:1, 4.2:1, 4.3:1, 4.5:1, 4.7:1, 4.9:1, 5.1:1, 5.3:1, 5.5:1, 5.7:1, 5.9:1, 6.1:1, 6.3:1, 6.5:1, 6.7:1, 6.9:1, 7.1:1, 7.3:1, 7.5:1, 7.7:1, 7.9:1, 8.1:1. 8.3:1, 8.5:1, or 8.7:1. In some embodiments, a weight ratio of the water to the magnesium chloride can be 1.2:1, 1.3:1, 1.4:1, 1.5:1, 1.6:1, 1.7:1, 1.8:1, 1.9:1, 2:1, 2.1:1, 2.2:1, 2.3:1, 2.4:1 or 2.5:1 to 2.6:1, 2.7:1, 2.8:1, 2.9:1, 3:1, 3.1:1, 3.2:1, 3.3:1, 3.4:1, 3.5:1, 3.6:1, 3.7:1, 3.8:1, 3.9:1, 4:1, 4.1:1, 4.2:1, 4.3:1, 4.4:1, or 4.5:1. In some embodiments, the weight ratio of the magnesium oxide to the magnesium chloride in the binder can be 0.8:1, 1:1, 1.2:1, 1.4:1, 1.6:1, 1.8:1, 2:1, 2.2:1, 2.25:1, 2.3:1, 2.35:1, 2.4:1, 2.45:1, 2.5:1, 2.55:1, 2.6:1, 2.7:1, 2.8:1, or 2.9:1, 3:1, 3.1:1, 3.2:1, 3.3:1, 3.4:1, or 3.5:1 to 3.6:1, 3.7:1, 3.8:1, 3.9:1, 4:1, 4.1:1, 4.2:1, 4.3:1, 4.5:1, 4.7:1, 4.9:1, 5.1:1, 5.3:1, 5.5:1, 5.7:1, 5.9:1, 6.1:1, 6.3:1, 6.5:1, 6.7:1, 6.9:1, 7.1:1, 7.3:1, 7.5:1, 7.7:1, 7.9:1, 8.1:1. 8.3:1, 8.5:1, or 8.7:1 and the weight ratio of the water to the magnesium chloride can be 1.2:1, 1.3:1, 1.4:1, 1.5:1, 1.6:1, 1.7:1, 1.8:1, 1.9:1, 2:1, 2.1:1, 2.2:1, 2.3:1, 2.4:1 or 2.5:1 to 2.6:1, 2.7:1, 2.8:1, 2.9:1, 3:1, 3.1:1, 3.2:1, 3.3:1, 3.4:1, 3.5:1, 3.6:1, 3.7:1, 3.8:1, 3.9:1, 4:1, 4.1:1, 4.2:1, 4.3:1, 4.4:1, or 4.5:1. It should be understood that, as the binder cures, the amount of water present can decrease, e.g., via evaporation. It should also be understood that, as the binder cures, at least a portion of the water present in the binder when initially formed can react to form one or more compounds that can be produced as the binder cures, e.g., one or more magnesium oxychloride compounds can be formed that can consume at least a portion of the liquid water used to make the binder.

The weight ratio of the magnesium oxide to the magnesium chloride is based on $MgCl_2$. As such, if the magnesium chloride is in the form of a hydrate, e.g., magnesium chloride hexahydrate, the weight ratio of the magnesium oxide to the magnesium chloride is based on the weight of the $MgCl_2$ and does not include the water present in the magnesium chloride hexahydrate. The weight ratio of the water to the magnesium chloride is based on $MgCl_2$. As such, if the magnesium chloride is in the form of a hydrate, e.g., magnesium chloride hexahydrate, the weight ratio of the water to the magnesium chloride is based on the weight of the $MgCl_2$, where the amount of the water includes the liquid water added to make the binder plus the water present in the hydrate form of the magnesium chloride.

In some embodiments, when the binder includes magnesium chloride, the binder can include about 7.5 wt %, 8 wt %, 9 wt %, 10 wt %, 11 wt %, 12 wt %, 13 wt %, 14 wt %, 15 wt %, 16 wt %, 17 wt %, 18 wt %, 18.3 wt %, 18.6 wt %, about 18.8 wt %, about 19 wt %, about 19.3 wt %, about 19.5 wt %, about 19.7 wt %, about 20 wt %, about 20.3 wt %, or about 20.5 wt % to about 20.7 wt %, about 21 wt %, about 21.3 wt %, about 21.5 wt %, about 21.7 wt %, about 22 wt %, about 22.3 wt %, about 22.5 wt %, about 22.7 wt %, about 23 wt %, 24 wt %, 25 wt %, 27 wt %, 29 wt %, 31 wt %, 33 wt %, 35 wt %, 37 wt %, 39 wt %, or 41 wt % of chlorine, based on the combined weight of the magnesium oxide and the magnesium chloride.

In some embodiments, when the binder includes the phosphate-based material, the phosphate-based material can be or can include, but is not limited to, phosphoric acid. In some embodiments, when the binder includes the silica-containing material, the silica-containing material can be or can include, but is not limited to, fumed silica. In some embodiments, when the binder includes the silica-containing material and/or the silica/alumina-containing material, such materials can be or can include, but are not limited to, one or more pozzolans. In some embodiments, the third constituent can be initially provided in the form of a powder that can be mixed, blended, or otherwise combined with water that can form a mild acid, also referred to as a Brønsted-Lowry acid. In some embodiments, when water and the third constituent are brought together the resulting mixture can have a pH that can be less than the pH of the magnesium hydroxide that can be formed when the magnesium oxide and water are brought together.

In some embodiments, in addition to the magnesium oxide, water, and the magnesium chloride, the binder can include one or more fourth constituents. In some embodiments, the fourth constituent can be or can include, but is not limited to, calcium chloride ($CaCl_2$), sodium chloride (NaCl), potassium chloride (KCl), or a mixture thereof. In some embodiments, the fourth constituent can include at least two of calcium chloride, sodium chloride, and potassium chloride. In other embodiments, the fourth constituent can include calcium chloride, sodium chloride, and potassium chloride.

In some embodiments, if present, a total amount of the fourth constituent, i.e., any calcium chloride, any sodium chloride, and/or any potassium chloride, in the binder can be present in an amount of about 0.1 wt %, about 0.3 wt %, about 0.5 wt %, about 0.7 wt %, about 1 wt %, about 1.5 wt %, about 2 wt %, about 2.5 wt %, about 3 wt %, about 3.5 wt %, about 4 wt %, about 4.5 wt % to about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, or about 10 wt % to about 12 wt %, about 14 wt %, about 16 wt %, about 18 wt %, about 20 wt %, about 22 wt %, about 24 wt %, about 26 wt %, about 28 wt %, or about 30 wt %, based on the weight of the magnesium chloride present in the binder. In some embodiments, the binder can include about 0.1 wt %, about 0.3 wt %, about 0.5 wt %, about 0.7 wt %, about 1 wt %, about 1.5 wt %, about 2 wt %, about 2.5 wt %, about 3 wt %, about 3.5 wt %, about 4 wt %, about 4.5 wt % to about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, or about 10 wt % to about 12 wt %, about 14 wt %, about 16 wt %, about 18 wt %, about 20 wt %, about 22 wt %, about 24 wt %, about 26 wt %, about 28 wt %, or about 30 wt % of calcium chloride, based on the weight of the magnesium chloride present in the binder. In some embodiments, the binder can include about 0.1 wt %, about 0.3 wt %, about 0.5 wt %, about 0.7 wt %, about 1 wt %, about 1.5 wt %, about 2 wt %, about 2.5 wt %, about 3 wt %, about 3.5 wt %, about 4 wt %, about 4.5 wt % to about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, or about 10 wt % to about 12 wt %, about 14 wt %, about 16 wt %, about 18 wt %, about 20 wt %, about 22 wt %, about 24 wt %, about 26 wt %, about 28 wt %, or about 30 wt % of sodium chloride, based on the weight of the magnesium chloride present in the binder. In some embodiments, the binder can include about 0.1 wt %, about 0.3 wt %, about 0.5 wt %, about 0.7 wt %, about 1 wt %, about 1.5 wt %, about 2 wt %, about 2.5 wt %, about 3 wt %, about 3.5 wt %, about 4 wt %, about 4.5 wt % to about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, or about 10 wt % to about 12 wt %, about 14 wt %, about 16 wt %, about 18 wt %, about 20 wt %, about 22 wt %, about 24 wt %, about 26 wt %, about 28 wt %, or about 30 wt % of potassium chloride, based on the weight of the magnesium chloride present in the binder.

In some embodiments, the binder can include calcium chloride in an amount of about 0.5 wt %, about 1 wt %, about 1.5 wt %, or about 2 wt % to about 2.5 wt %, about 3 wt %, about 3.5 wt %, about 4 wt %, about 4.5 wt %, or about 5 wt %, based on the weight of the magnesium chloride present in the binder. In some embodiments, the binder can include sodium chloride in an amount of about 0.3 wt %, about 0.5 wt %, about 0.7 wt %, or about 1 wt % to about 1.3 wt %, about 1.5 wt %, about 1.8 wt %, or about 2 wt %, based on the weight of the magnesium chloride present in the binder. In some embodiments, the binder can include potassium chloride in an amount of about 0.1 wt %, about 0.3 wt %, about 0.5 wt %, or about 0.7 wt % to about 1 wt %, about 1.2 wt %, about 1.3 wt %, or about 1.5 wt %, based on the weight of the magnesium chloride present in the binder. In still other embodiments, the binder can include about 0.5 wt %, about 1 wt %, about 1.5 wt %, or about 2 wt % to about 2.5 wt %, about 3 wt %, about 3.5 wt %, about 4 wt %, about 4.5 wt %, or about 5 wt % of calcium chloride, about 0.3 wt %, about 0.5 wt %, about 0.7 wt %, or about 1 wt % to about 1.3 wt %, about 1.5 wt %, about 1.8 wt %, or about 2 wt % of sodium chloride, and about 0.1 wt %, about 0.3 wt %, about 0.5 wt %, or about 0.7 wt % to about 1 wt %, about 1.2 wt %, about 1.3 wt %, or about 1.5 wt % of potassium chloride, based on the weight of the magnesium chloride present in the binder. It should be understood that when the magnesium chloride is in the form of a hydrate, only the weight of the magnesium chloride present in the magnesium chloride hydrate is used to determine the weight percent of the fourth constituent(s).

In some embodiments, when present, the amount of calcium chloride can be greater than the amount of sodium chloride. In some embodiments, when present, the amount of calcium chloride can be greater than the amount of potassium chloride. In some embodiments, when present, the amount of calcium chloride can be greater than a combined amount of sodium chloride and potassium chloride. In some embodiments, when present, the amount of sodium chloride can be greater than the amount of potassium chloride.

In some embodiments, in addition to the magnesium oxide, water, and the magnesium chloride, and, if present, the fourth constituent, the binder can include one or more fifth constituents or additives. In some embodiments, the additive can be or can include, but is not limited to, sodium polyacrylate, chitosan, magnesium (poly)acrylate, polyacrylamide, polydiallyldimethylammonium chloride (polyDADMAC), polyacrylic acid, poly(acrylamide-co-diallyldimethylammonium chloride), or a mixture thereof. In some embodiments, the additive can be polydiallyldimethylammonium chloride. In some embodiments, the additive can be poly(acrylamide-co-diallyldimethylammonium chloride). In some embodiments, the additive can be sodium polyacrylate and chitosan, magnesium (poly)acrylate and polyacrylamide, magnesium (poly)acrylate and chitosan, polydiallyldimethylammonium chloride and chitosan, polydiallyldimethylammonium chloride and polyacrylic acid, poly(acrylamide-co-diallyldimethylammonium chloride and sodium polyacrylate, polydiallyldimethylammonium chloride and sodium polyacrylate, or polydiallyldimethylammonium chloride, sodium polyacrylate, and chitosan.

In some embodiments, if present, each additive in the binder can independently be present in a amount from 0.05 wt %, 0.1 wt %, 0.5 wt %, 0.7 wt %, 1 wt %, 1.5 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, or 25 wt % to 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, or 50 wt %, based on the combined weight of the magnesium oxide, the magnesium chloride, and the water. It should be understood that when the magnesium chloride is in the form of a hydrate, any water present in the magnesium chloride hydrate is accounted from as water in the combined weight of the magnesium oxide, the magnesium chloride, and the water.

In some embodiments, the binder can include about 1 wt %, about 1.5 wt %, about 2 wt %, or about 2.5 wt % about 3 wt %, about 3.5 wt %, about 4 wt %, about 4.5 wt %, about 5 wt %, about 6 wt %, about 7 wt %, about 8 wt %, about 9 wt %, or about 10 wt % to about 12 wt %, about 13 wt %, about 14 wt %, about 15 wt %, about 16 wt %, about 17 wt %, about 18 wt %, about 19 wt %, or about 20 wt % of sodium polyacrylate based on the total amount of magnesium oxide in the binder and about 0.05 wt %, about 0.1 wt %, about 0.5 wt %, about 1 wt %, about 1.5 wt %, about 2 wt %, about 2.5 wt % to about 3 wt %, about 3.5 wt %, about 4 wt %, about 4.5 wt %, about 5 wt %, about 5.5 wt %, about 6 wt %, about 7 wt %, about 8 wt %, about 9 wt %, or about 10 wt % to about 12 wt %, about 13 wt %, about 14 wt %, about 15 wt %, about 16 wt %, about 17 wt %, about 18 wt %, about 19 wt %, or about 20 wt % of chitosan based on the combined weight of the magnesium oxide, the magnesium chloride, and the water in the binder.

In some embodiments, the binder can include about 0.25 wt %, about 0.5 wt %, about 1 wt %, about 1.5 wt %, about 2 wt %, about 2.5 wt % to about 3 wt %, about 3.5 wt %, about 4 wt %, about 4.5 wt %, about 5 wt %, about 6 wt %, about 7 wt %, about 8 wt %, about 9 wt %, or about 10 wt % to about 12 wt %, about 13 wt %, about 14 wt %, about 15 wt %, about 16 wt %, about 17 wt %, about 18 wt %, about 19 wt %, or about 20 wt % of magnesium (poly) acrylate based on the total amount of magnesium oxide in the binder and about 0.05 wt %, about 0.1 wt %, about 0.5 wt %, about 1 wt %, about 1.5 wt %, about 2 wt %, about 2.5 wt % to about 3 wt %, about 3.5 wt %, about 4 wt %, about 4.5 wt %, about 5 wt %, about 5.5 wt %, about 6 wt %, about 7 wt %, about 8 wt %, about 9 wt %, or about 10 wt % to about 12 wt %, about 13 wt %, about 14 wt %, about 15 wt %, about 16 wt %, about 17 wt %, about 18 wt %, about 19 wt %, or about 20 wt % of polyacrylamide based on the combined weight of the magnesium oxide, the magnesium chloride, and the water in the binder.

In some embodiments, the binder can include about 0.25 wt %, about 0.5 wt %, about 1 wt %, about 1.5 wt %, about 2 wt %, about 2.5 wt % to about 3 wt %, about 3.5 wt %, about 4 wt %, about 4.5 wt %, about 5 wt %, about 6 wt %, about 7 wt %, about 8 wt %, about 9 wt %, or about 10 wt % to about 12 wt %, about 13 wt %, about 14 wt %, about 15 wt %, about 16 wt %, about 17 wt %, about 18 wt %, about 19 wt %, or about 20 wt % of magnesium (poly) acrylate based on the total amount of magnesium oxide in the binder and about 0.05 wt %, about 0.1 wt %, about 0.5 wt %, about 1 wt %, about 1.5 wt %, about 2 wt %, about 2.5 wt % to about 3 wt %, about 3.5 wt %, about 4 wt %, about 4.5 wt %, about 5 wt %, about 5.5 wt %, about 6 wt %, about 7 wt %, about 8 wt %, about 9 wt %, or about 10 wt % to about 12 wt %, about 13 wt %, about 14 wt %, about 15 wt %, about 16 wt %, about 17 wt %, about 18 wt %, about 19 wt %, or about 20 wt % of chitosan based on the combined weight of the magnesium oxide, the magnesium chloride, and the water in the binder.

In some embodiments, the binder can include about 1 wt %, about 1.5 wt %, about 2 wt %, about 2.5 wt % to about 3 wt %, about 3.5 wt %, about 4 wt %, about 4.5 wt %, about 5 wt %, about 6 wt %, about 7 wt %, about 8 wt %, about 9 wt %, or about 10 wt % to about 12 wt %, about 13 wt %, about 14 wt %, about 15 wt %, about 16 wt %, about 17 wt %, about 18 wt %, about 19 wt %, or about 20 wt % of polydiallyldimethylammonium chloride based on the total amount of magnesium chloride in the binder. In other embodiments, the binder can include about 1 wt %, about 1.5 wt %, about 2 wt %, about 2.5 wt % to about 3 wt %, about 3.5 wt %, about 4 wt %, about 4.5 wt %, about 5 wt %, about 6 wt %, about 7 wt %, about 8 wt %, about 9 wt %, or about 10 wt % to about 12 wt %, about 13 wt %, about 14 wt %, about 15 wt %, about 16 wt %, about 17 wt %, about 18 wt %, about 19 wt %, or about 20 wt % of polydiallyldimethylammonium chloride based on the total amount of magnesium chloride in the binder and about 0.05 wt %, about 0.1 wt %, about 0.5 wt %, about 1 wt %, about 1.5 wt %, about 2 wt %, about 2.5 wt % to about 3 wt %, about 3.5 wt %, about 4 wt %, about 4.5 wt %, about 5 wt %, about 5.5 wt %, about 6 wt %, about 7 wt %, about 8 wt %, about 9 wt %, or about 10 wt % to about 12 wt %, about 13 wt %, about 14 wt %, about 15 wt %, about 16 wt %, about 17 wt %, about 18 wt %, about 19 wt %, or about 20 wt % of chitosan based on the combined weight of the magnesium oxide, the magnesium chloride, and the water in the binder.

In some embodiments, the binder can include about 1 wt %, about 1.5 wt %, about 2 wt %, about 2.5 wt %, about 3 wt %, about 3.5 wt %, about 4 wt %, about 4.5 wt %, about 5 wt %, about 6 wt %, about 7 wt %, about 8 wt %, about 9 wt %, or about 10 wt % to about 12 wt %, about 13 wt %, about 14 wt %, about 15 wt %, about 16 wt %, about 17 wt %, about 18 wt %, about 19 wt %, or about 20 wt % of polydiallyldimethylammonium chloride based on the total amount of magnesium chloride in the binder and about 0.05 wt %, about 0.1 wt %, about 0.5 wt %, about 1 wt %, about 1.5 wt %, about 2 wt %, about 2.5 wt %, about 3 wt %, about 3.5 wt %, about 4 wt %, about 4.5 wt %, about 5 wt %, about 5.5 wt %, about 6 wt %, about 7 wt %, about 8 wt %, about 9 wt %, or about 10 wt % to about 12 wt %, about 13 wt %, about 14 wt %, about 15 wt %, about 16 wt %, about 17 wt %, about 18 wt %, about 19 wt %, or about 20 wt % of polyacrylic acid based on the combined weight of the magnesium oxide, the magnesium chloride, and the water in the binder.

In some embodiments, the binder can include about 0.05 wt %, about 0.1 wt %, about 0.5 wt %, about 1 wt %, about 1.5 wt %, about 2 wt %, about 2.5 wt % to about 3 wt %, about 3.5 wt %, about 4 wt %, about 4.5 wt %, about 5 wt %, about 5.5 wt %, about 6 wt %, about 7 wt %, about 8 wt %, about 9 wt %, or about 10 wt % to about 12 wt %, about 13 wt %, about 14 wt %, about 15 wt %, about 16 wt %, about 17 wt %, about 18 wt %, about 19 wt %, or about 20 wt % of poly(acrylamide-co-diallyldimethylammonium chloride based on the combined weight of the magnesium oxide, the magnesium chloride, and the water in the binder. In some embodiments, the binder can include about 0.05 wt %, about 0.1 wt %, about 0.5 wt %, about 1 wt %, about 1.5 wt %, about 2 wt %, about 2.5 wt % to about 3 wt %, about 3.5 wt %, about 4 wt %, about 4.5 wt %, about 5 wt %, about 5.5 wt %, about 6 wt %, about 7 wt %, about 8 wt %, about 9 wt %, or about 10 wt % to about 12 wt %, about 13 wt %, about 14 wt %, about 15 wt %, about 16 wt %, about 17 wt %, about 18 wt %, about 19 wt %, or about 20 wt % of poly(acrylamide-co-diallyldimethylammonium chloride based on the combined weight of the magnesium oxide, the magnesium chloride, and the water in the binder and about 1 wt %, about 1.5 wt %, about 2 wt %, about 2.5 wt %, about 3 wt %, about 3.5 wt %, about 4 wt %, about 4.5 wt %, about 5 wt %, about 6 wt %, about 7 wt %, about 8 wt %, about 9 wt %, or about 10 wt % to about 12 wt %, about 13 wt %, about 14 wt %, about 15 wt %, about 16 wt %, about 17 wt %, about 18 wt %, about 19 wt %, or about 20 wt % of sodium polyacrylate based on the total amount of magnesium oxide in the binder.

In some embodiments, the binder can include about 1 wt %, about 1.5 wt %, about 2 wt %, or about 2.5 wt %, about 3 wt %, about 3.5 wt %, about 4 wt %, about 4.5 wt %, about 5 wt %, about 6 wt %, about 7 wt %, about 8 wt %, about 9 wt %, or about 10 wt % to about 12 wt %, about 13 wt %, about 14 wt %, about 15 wt %, about 16 wt %, about 17 wt %, about 18 wt %, about 19 wt %, or about 20 wt % of polydiallyldimethylammonium chloride based on the total amount of magnesium chloride in the binder and about 1 wt %, about 1.5 wt %, about 2 wt %, about 2.5 wt %, about 3 wt %, about 3.5 wt %, about 4 wt %, about 4.5 wt %, about 5 wt %, about 6 wt %, about 7 wt %, about 8 wt %, about 9 wt %, or about 10 wt % to about 12 wt %, about 13 wt %, about 14 wt %, about 15 wt %, about 16 wt %, about 17 wt %, about 18 wt %, about 19 wt %, or about 20 wt % of sodium polyacrylate based on the total amount of magnesium oxide in the binder. In other embodiments, the binder can include about 1 wt %, about 1.5 wt %, about 2 wt %, about 2.5 wt % to about 3 wt %, about 3.5 wt %, about 4 wt %, about 4.5 wt %, about 5 wt %, about 6 wt %, about 7 wt %, about 8 wt %, about 9 wt %, or about 10 wt % to about 12 wt %, about 13 wt %, about 14 wt %, about 15 wt %, about 16 wt %, about 17 wt %, about 18 wt %, about 19 wt %, or about 20 wt % of polydiallyldimethylammonium chloride based on the total amount of magnesium chloride in the binder, about 1 wt %, about 1.5 wt %, about 2 wt %, or about 2.5 wt %, about 3 wt %, about 3.5 wt %, about 4 wt %, about 4.5 wt %, about 5 wt %, about 6 wt %, about 7 wt %, about 8 wt %, about 9 wt %, or about 10 wt % to about 12 wt %, about 13 wt %, about 14 wt %, about 15 wt %, about 16 wt %, about 17 wt %, about 18 wt %, about 19 wt %, or about 20 wt % of sodium polyacrylate based on the total amount of magnesium oxide in the binder, and about 0.05 wt %, about 0.1 wt %, about 0.5 wt %, about 1 wt %, about 1.5 wt %, about 2 wt %, about 2.5 wt % to about 3 wt %, about 3.5 wt %, about 4 wt %, about 4.5 wt %, about 5 wt %, about 5.5 wt %, about 6 wt %, about 7 wt %, about 8 wt %, about 9 wt %, or about 10 wt % to about 12 wt %, about 13 wt %, about 14 wt %, about 15 wt %, about 16 wt %, about 17 wt %, about 18 wt %, about 19 wt %, or about 20 wt % of chitosan based on the combined weight of the magnesium oxide, the magnesium chloride, and the water in the binder.

In some embodiments, the binder can be prepared immediately before contacting the plurality of cellulosic substrates with the binder to produce a mixture and the mixture can be allowed to set for a time period sufficient to allow the binder to at least partially cure to produce a composite cellulosic product. In other embodiments, the binder can be partially prepared at a separate location and/or at a separate time at a site from where combination with the cellulosic substrates is to occur. For example, in some embodiments, a mixture of magnesium chloride and a first portion of the water can be prepared and a mixture of magnesium oxide and a second portion of the water can be prepared at a separate location and these two mixtures can be transported to and combined at the location where the cellulosic substrates are to be combined with the binder. In another example, the magnesium chloride and water can be combined to produce a mixture that can be transported to and combined with magnesium oxide at the location where the cellulosic substrates are to be combined with the binder. In still other embodiments, the constituents of the binder can be combined with one another in the presence of the cellulosic substrates. For example, in one embodiment, a mixture of the magnesium oxide and a first portion of the water can be combined with the cellulosic substrates to produce an initial mixture and a mixture of the third constituent, e.g., magnesium chloride, and a second portion of the water can be combined with the initial mixture to produce the binder in the presence of the cellulosic substrates and thereby form the mixture thereof. In another example, the magnesium oxide can be combined with the cellulosic substrates to produce the initial mixture and a mixture of the water and the third constituent, e.g., magnesium chloride, can be combined with the initial mixture to produce the binder in the presence of the cellulosic substrates and thereby form the mixture thereof. In yet another example, third constituent, e.g., magnesium chloride, can be combined with the cellulosic substrates to produce the initial mixture and a mixture of the magnesium oxide and the water can be combined with the initial mixture to produce the binder in the presence of the cellulosic substrates and thereby form the mixture thereof. It should be understood that the fourth constituent and/or the additive, if present, can be combined at any point during the first, second, and third constituents can be combined with one another to produce the binder.

In some embodiments, when the binder is prepared heat can be applied during mixing of the constituents that make up the binder. In some embodiments, during preparation of the binder, the constituents that make up the binder can be heated to a temperature greater than room temperature. In some embodiments, the constituents that make up the binder can be heated to a temperature of about 25° C., about 30° C., about 35° C., about 40° C., about 45° C., about 50° C., or about 55° C. to about 60° C., about 65° C., about 70° C., about 75° C., about 80° C., about 85° C., about 90° C., or about 95° C.

In some embodiments, the constituents that make up the binder can be subjected to agitation during mixing to produce the binder. In some embodiments, the constituent that make up the binder can be combined via agitating, mixing, blending, homogenization, ultrasonication, colloid milling, microfluidic mixing, other processes, or any combination of such processes. For example, the constituents that make up the binder can be mixed via stirring and/or mixed inline by flowing through a mixing tube that includes one or more static mixing elements therein, or any other conventional process or apparatus can be used to agitate or otherwise mix the constituents that are used to make the binder.

As used herein, the term "cellulosic" refers to a material that includes cellulose. In some embodiments, the cellulosic substrates can include cellulose. In other embodiments, the cellulosic substrates can include cellulose and hemicellulose. In still other embodiments, the cellulosic substrates can include cellulose, lignin, and hemicellulose.

In some embodiments, the plurality of cellulosic substrates can be or include, but are not limited to, one or more hardwoods, one or more softwoods, a mixture of hardwood and softwood, other plant materials, cellulosic materials derived from one or more hardwoods, softwoods, other plant material, or any mixture thereof. In some embodiments, the cellulosic material can include, but is not limited to, straw, hemp, sisal, cotton stalk, wheat, bamboo, hemp, sabai grass, rice straw, banana leaves, paper mulberry (i.e., bast fiber), abaca leaves, pineapple leaves, esparto grass leaves, fibers from the genus *Hesperaloe* in the family Agavaceae jute, salt water reeds, palm fronds, flax, ground nut shells, hardwoods, softwoods, recycled fiberboards such as high density fiberboard, medium density fiberboard, low density fiberboard, oriented strand board, particleboard, animal fibers (e.g., wool, hair), recycled paper products (e.g., newspapers, cardboard, cereal boxes, and magazines), or any mixture thereof. Illustrative types of wood can be or can include, but are not limited to, one or more of: alder, almond, apple, ash, aspen, basswood, beech, birch, cedar, cherry, chinaberry, cottonwood, cypress, douglas fir, elm, fir, gum, hackberry, helm, hickory, huiache, jessamine, lenga, maple, oak, olive, pear, pecan, pine, poplar, redwood, sassafras, spruce, sycamore, tallow, tepa, walnut, and willow.

In some embodiments, the cellulosic substrates include fibers derived from one or more of hardwoods, one or more soft woods, other plant material(s), or a mixture thereof. For example, in some embodiments, the cellulosic substrates can be or can include fiber derived from wood and/or other plant material(s) by subjecting wood and/or other plant material(s) to a lignin extraction process such that the cellulosic substrates contain less lignin or are free of lignin as compared to the wood and/or other plant material(s) prior to being subjected to the lignin extraction process. In some embodiments, the lignin can be extracted, separated, or otherwise recovered from the wood and/or other plant material(s) matter using any of a number of well-established processes. For example, in the pulp and paper industry, lignin-containing materials such as wood, straw, corn stalks, bagasse, and other vegetable and plant tissues can be processed to recover the cellulose or pulp via the known kraft process, sulfate process, or sulfite process. Suitable sources of cellulosic substrates that can be free of or contain less lignin than the material such substrates can be derived from can be or can include, but are not limited to, paper, toilet paper, facial tissue, paper towels, newspaper, magazine paper, cardboard, and the like.

In some embodiments, the cellulosic substrates can be free or substantially free, e.g., contain less than 1 wt %, of water based on the dry weight of the cellulosic substrates. In other embodiments, the cellulosic substrates can include or contain water on, about, and/or within the substrates. In some embodiments, the lignocellulose substrates can have a moisture or water content of about 1 wt %, about 3 wt %, about 5 wt %, about 7 wt %, about 9 wt %, about 11 wt %, about 13 wt %, or about 15 wt % to about 17 wt %, about 19 wt %, about 21 wt %, about 23 wt %, about 25 wt %, about 27 wt %, about 29 wt %, about 31 wt %, about 33 wt %, about 35 wt %, about 40 wt %, or greater, based on the dry weight of the lignocellulose substrates. In some embodiments, the cellulosic substrates can be used as received or can be subjected to a drying process, e.g., kiln drying, to reduce a moisture content to a desired level. In some embodiments, the amount of water in the binder can be adjusted based, at least in part, on the moisture content of the cellulosic substrates. In other embodiments, the amount of water in the binder can remain substantially constant and can be independent from any moisture concentration of the cellulosic substrates.

In some embodiments, the cellulosic substrates can be mixed, blended, sprayed, coated, applied, combined, or otherwise contacted with the binder to produce a mixture. In some embodiments, the binder can be formed in the presence of the cellulosic substrates. For example, a first mixture that includes the magnesium oxide and a first portion of the water and a second mixture that includes the magnesium chloride and a second portion of the water can be combined with the cellulosic substrates such that the binder can be formed in the presence of the cellulosic substrates. In some embodiments, the mixture of the binder an the cellulosic substrates can include about 0.5 wt %, about 1 wt %, about 3 wt %, about 5 wt %, about 10 wt %, about 15 wt %, about 20 wt %, about 25 wt %, about 30 wt %, about 35 wt %, about 40 wt %, about or about 45 wt % to about 50 wt %, about 55 wt %, about 60 wt %, about 65 wt %, about 70 wt %, about 75 wt %, about 80 wt %, about 85 wt %, about 90 wt %, about 92 wt %, about 94 wt %, about 96 w %, about 97 wt %, or about 98 wt % of the plurality of cellulosic substrates, based on a total weight of the mixture upon contact between the cellulosic substrates and the binder.

In some embodiments, mixture can be allowed to set for a period of time that can be sufficient for the binder to at least partially cure to produce the composite cellulosic product. In some embodiments, the time period can be from 1 minute, 5 minutes, 15 minutes, 30 minutes, 1 hour, 6 hours, or 12 hours to 1 day, 3 days, 7 days, 10 days, 14 days, 18 days, 24 days, 28 days, or longer to produce a final composite product.

As used herein, the terms "curing," "cured," "at least partially curing," "at least partially cured," and similar terms are intended to refer to the structural and/or morphological change that occurs in the mixture, such as by covalent chemical reaction (crosslinking), ionic interaction or clustering, phase transformation or inversion, and/or hydrogen bonding when the mixture of the cellulosic substrates and the binder is allowed to set for a sufficient period of time to cause the properties of a flexible substrate, such as a nonwoven mat or blanket of cellulosic substrates and/or a rigid or semi-rigid substrate, such as a wood or other cellulosic containing board or sheet, to which an effective amount of the binder has been applied, to be altered.

In some embodiments, pressure can be applied to the mixture of the plurality of cellulosic substrates and the binder during at least a portion of the time period the mixture is allowed to set to produce the composite cellulosic product. In such embodiments, the pressure applied to the mixture can be from about 950 kPa, about 1,100 kPa, about 1,500 kPa, about 1,750 kPa, or about 2,000 kPa to about 2,500 kPa, about 3,000 kPa, about 3,500 kPa, about 4,000 kPa, r about 4,500 kPa or greater.

In some embodiments, the mixture of the plurality of cellulosic substrates and the binder can be heated to a temperature greater than room temperature for at least a portion of the time period the mixture is allowed to set to produce the composite product. In some embodiments, the mixture can be heated to a temperature of about 30° C., 50° C., 70° C., 90° C., 100° C., 125° C., 150° C., or 175° C., to 200° C., 250° C., 300° C., 350° C., 400° C. or greater during at least a portion of the time period the mixture is allowed to set to produce the composite product. In some embodiments, the mixture can be heated in air or in an inert or substantially inert atmosphere such as nitrogen. In some embodiments, heating mixture of the cellulosic substrates and the binder can accelerate the at least partial curing of the binder to produce the composite product.

In some embodiments, the composite cellulosic product can include about 0.5 wt %, about 1 wt %, about 3 wt %, about 5 wt %, about 10 wt %, about 15 wt %, about 20 wt %, about 25 wt %, about 30 wt %, about 35 wt %, about 40 wt %, about or about 45 wt % to about 50 wt %, about 55 wt %, about 60 wt %, about 65 wt %, about 70 wt %, about 75 wt %, about 80 wt %, about 85 wt %, about 90 wt %, about 92 wt %, about 94 wt %, about 96 w %, about 97 wt %, or about 98 wt % of the plurality of cellulosic substrates, based on a total weight of the composite product. The particular amount of cellulosic substrates in the composite product can depend, at least in part, on the particular type of composite product.

In some embodiments, the mixture of the composite cellulosic substrates and the binder can be pressed, molded, or otherwise shaped to a desired end shape once the mixture has been formed. In some embodiments, the mixture can be introduced into a press and pressed between two or more plates during at least a portion of the time the mixture is allowed to set to produce the composite product. In other embodiments, the mixture can be introduced into a mold such that the mixture is located within an internal volume of the mold. In some embodiments, such mold can be configured to press the mixture or not press the mixture.

In some embodiments, the mixture of the cellulosic substrates and binder can be left under a pressure in a press or a mold for a residence time or period of time of about 1 hour to about 12 or about 24 hours to produce a composite product that includes the cellulosic substrates and the at least partially cured binder. After the period of time, the composite cellulosic product can be removed from the press or the mold. While the composite cellulosic product made up of the combination of the cellulosic substrates and the at least partially cured binder can generally be handled at this point, further drying of the composite cellulosic product, e.g., application of heat or just allowing the composite cellulosic product to sit at room temperature, can improve the strength and/or other properties of the composite cellulosic product. Full strength of the composite cellulosic product can typically be reached about 28 days after removal from the press or mold. Typically, sufficient strength can be available after about 5 hours to about 12 hours or about 24 hours that the composite cellulosic product can be stacked, shipped, and otherwise handled, potentially even also installed, provided that the load carrying properties are not required as part of the structure until sufficient time has elapsed after removal from the mold to meet specified strength requirements.

In some embodiments, the binder can be combined with the cellulosic substrates in a manner that can cause all of the surfaces of the cellulosic substrates to be coated with the binder. In other embodiments, the binder can be contacted with one or two sides of the cellulosic substrate, e.g., in the manufacture of plywood the sides of the veneer that can be contacted with one another can be coated or otherwise contacted with the binder. In such embodiment, the outer veneers can be contacted on only one surface, whereas veneers disposed between the two outer veneers can be contacted with the binder on both opposing surfaces that will be adhered to the adjacent veneers during manufacture of the plywood. Application of the binder to the cellulosic media could include spraying, dipping, blending, stirring, or other combination and surface wetting procedure. Other options for thoroughly contacting the cellulosic substrates with the binder can include initially drawing a vacuum on the combined cellulosic substrates and the binder to cause thorough wetting. Such wetting procedure also typically occurs before the cellulosic substrates and the binder are placed within a press or a mold having a shape desired for the composite cellulosic product, but the wetting of the cellulosic material could occur within the press or mold as well. Furthermore, as noted above, the constituents used to make the binder can be applied at different times or steps of the forming process.

The composite cellulosic product can be any one of a number of various products that can be used in the building, furniture, and/or other industries. Illustrative composite products can be or include, but are not limited to, plywood (e.g., hardwood plywood and/or softwood plywood), oriented strand board ("OSB"), engineered wood flooring, particleboard, fiberboard (e.g., medium density fiberboard ("MDF") and/or high density fiberboard ("HDF")), chipboard, flakeboard, waferboard, structural composite lumber, elongated load carrying members (e.g., posts, beams, joists, cross-laminated lumber, etc.), and other cellulosic products. Structural composite lumber can include, but is not limited to, laminated veneer lumber (LVL), parallel strand lumber (PSL), laminated strand lumber (LSL), and oriented strand lumber (OSL).

In some embodiments, the cellulosic substrates can be formed of multiple separate elements of cellulosic substrates. One example of such cellulosic substrates can include strands such as those utilized in oriented strand board (OSB), which would typically have a size of approximately between 100 mm to 150 mm×10 mm to 15 mm×0.6 mm to 0.8 mm. Another example of such cellulosic substrates can include wood chips, such as wood chips having a size less than about 1 cm×1 cm×1 cm. Another example of such cellulosic substrates can include sawdust having a particle size less than about 2 mm×2 mm×2 mm. Yet another example of such cellulosic substrates can include separate plies of wood peeled off of a log, such as is used in forming plywood. As noted above, the cellulosic substrates are not necessarily wood from a tree but can also be or can also include cellulosic substrates derived from other plants such as corn husks, rice straw, other green straw, and other cellulosic material, such as bamboo and hemp.

While application of heat is not necessary to manufacture the composite cellulosic product, heat can to some extent be inherently generated when the binder cures. For example, magnesium hydroxide can react with magnesium chloride and such reaction is generally an exothermic reaction. In various embodiments, additional external heat could be applied that could accelerate the curing of the binder and evaporation of excess water. During the manufacture of the composite cellulosic product, at least some water will evaporate and migrate away from the other constituents as the binder cures to produce the composite cellulosic product. This water vapor may to some extent contain other molecules besides purely water molecules. However, because no volatile organic compounds (VOCs) are included within the binder, and because the carbon within the cellulosic material does not undergo any appreciable chemical reaction during the curing of the binder, any outgassing from the manufacturing process should primarily be water vapor and can be free or essentially free of of VOCs.

Also, the carbon within the cellulosic substrates can remain stable within the cellulosic substrates for long-term sequestration away from the atmosphere. As such, a negligible carbon footprint can be provided by the manufacture of composite cellulosic products, limited only to any carbon release which might be associated with energy sources utilized in handling the constituents, in applying pressure thereto, and/or heating the mixture of the cellulosic substrates and the binder. A beneficially small overall carbon footprint, and carbon sequestration opportunity is thus provided utilizing the composite cellulosic products and processes for making same as disclosed herein.

In some embodiments, the composite cellulosic product, e.g., oriented strand board, can satisfy the Standard Test Method for Extended Duration Surface Burning Characteristics of Building Materials (30 min Tunnel Test) according to ASTM E2768-11(2018). Composite cellulosic products tested according to ASTM E2768-11(2018) used the red oak smoke calibration as outlined in the test. In some embodiments, the composite cellulosic product, e.g., oriented strand board, can satisfy the requirements to be classified as a Class C, Class B, or Class A product under the Standard Test Method for Extended Duration Surface Burning Characteristics of Building Materials (30 min Tunnel Test) according to ASTM E2768-11(2018). In some embodiments, the composite cellulosic product, e.g., an oriented strand board composite product, can have a flame spread of 0 and a smoke developed index of 15 or less, 10 or less, or 5 or less. Without wishing to be bound by theory, based on the ASTM E2768-11(2018) test results, it is believed the composite cellulosic product, e.g., oriented strand board, can also satisfy the Standard Test Method for Fire Tests of Building Construction and Materials according to ASTM E119-20. In some embodiments, the composite cellulosic product, e.g., oriented strand board, can satisfy the Standard Test Method for Extended Duration Surface Burning Characteristics of Building Materials (30 min Tunnel Test) according to ASTM E2768-11(2018) and can satisfy the Standard Test Method for Fire Tests of Building Construction and Materials according to ASTM E119-20.

EXPERIMENTAL EXAMPLES

In order to provide a better understanding of the foregoing discussion, the following non-limiting examples are offered. Although the examples are directed to specific embodiments, they are not to be viewed as limiting the invention in any specific respect.

Example 1

An oriented strand board type composite cellulosic product (Ex. 1) was manufactured. The binder included about 37.5 wt % of magnesium oxide, about 31.25 wt % of magnesium chloride hexahydrate, and about 31.25 w % of water, based on a combined weight of the magnesium oxide, the magnesium chloride hexahydrate, and the water. In this example, wood strands were provided which made up 20% of the whole mixture, i.e., the combination of the cellulosic substrates and the binder, along with 80% binder, so that the whole mixture of the wood strands and the binder was made up of 20% wood strands by weight, 30% magnesium oxide by weight, 25% magnesium chloride hexahydrate by weight, and 25% water by weight.

It should be understood that as some of the water evaporated or otherwise reacted chemically with and was incorporated into the composite cellulosic product, some adjustments occurred to the relative percentages that the constituents initially had when first combined with one another. In this example, the wood strands ended up making up slightly less than a third of the non-water constituents of the composite cellulosic product, the magnesium oxide ended up making up slightly more than a third of the non-water constituents, and the magnesium chloride ended up making up about a third of non-water constituents of the finished composite cellulosic product. In other embodiments, the percentage by weight of the cellulosic substrates could be adjusted and/or the other relative percentages of the constituents making up the binder could be adjusted.

The wood strands had a size of about 100 mm to about 150 mm by about 10 mm to about 15 mm by about 0.6 mm to about 0.8 mm. The wood strands were thoroughly wetted with the binder. After the wood strands were thoroughly combined with the binder, the mixture was placed within a mold. The mold had a shape with a smallest dimension being a thickness, and with this thickness being less than 10% of a dimension of a height and width thereof, so that a board-like product resulted. The mold was integrated into a press so that elevated pressure could be applied to the wood strands and binder within the mold. The press was activated and acted upon the mixture of the wood strands and the binder at a pressure of about 1,080 kPa (about 156 psi). This pressure was held for about 185 hours. The finished board product exhibited a flexural yield strength of 28.8 MPa (about 4,180 psi). The flexural yield strength was measured according to ASTM C1185-08(2016).

Example 2—Fire Resistance Test

Twelve oriented strand board composite cellulosic products (Ex. 2) were made and tested for fire resistance according to the Standard Test Method for Extended Duration Surface Burning Characteristics of Building Materials (30 min Tunnel Test) according to ASTM E2768-11(2018). The oriented strand board composite cellulosic product was made according to the following procedure. About 3,036.65 g of water was mixed with about 3,036.65 g of magnesium chloride hexahydrate salt until the salt fully dissolved in water. About 3,643.97 g of MgO was added to the solution and thoroughly mixed until the mixture was homogenized to form the binder. About 2,429.32 g of wood strands were added into a mixing container and the binder was poured into the container and mixed with the wood strands by shaking the container for about 30-60 seconds to coat the wood strands with the binder. The wood strands had a size of about 100 mm to about 150 mm by about 10 mm to about 15 mm by about 0.6 mm to about 0.8 mm. The coated wood strands were then placed in a cold press. A gasket was used to help seal the mold to reduce the amount of binder that would seep out along the edges of the mixture. The mold was maintained at room temperature and a pressure of about 1,060 kPa and allowed to sit for about 18 hours. Excess slurry was poured out for disposal. After about 18 hours, the composite products were removed from the mold and left to air set for at least 7 days. The oriented strand board composite cellulosic products each had a size of about 66 cm (about 26 inches) by about 66 cm (about 26 inches) by about 1.5 cm (about 0.6 inches). The oriented strand boards were then trimmed to a size of about 55 cm (about 22 inches) by about 61 cm (about 24 inches) by about 1.5 cm (about 0.6 inches).

The oriented strand board composite products were tested for fire resistance 30 days from a set time of the last composite product that was made, it took 12 business days to make all twelve composite products that were fire tested. The oriented strand board composite products were left in a conditioning room on days 27-30 after the boards were made in accordance with the requirements set out in ASTM E2768-11(2018). The twelve boards were assembled in the test apparatus and subjected to the Standard Test Method for Extended Duration Surface Burning Characteristics of Building Materials (30 min Tunnel Test) according to ASTM E2768-11(2018). The test results showed that the boards satisfied Class A and had a flame spread index=0 and a smoke developed index=15.

Example 3

A series of 3-ply plywood composite products were made that varied the weight ratio of magnesium oxide to magnesium chloride and, for one example, the weight ratio of water to magnesium chloride in the binder (Examples. 3-7). The 3-ply plywood composite products were made according to the following process.

The only difference was the composition of the binder used to make each 3-ply plywood. Table 1 below shows the weight percent ratio of magnesium chloride to magnesium chloride, the weight ratio of water to magnesium chloride, and the stress at failure that was measured according to ASTM D1037-99.

TABLE 1

| Example | MgO/MgCl2 Weight Ratio | H2O/MgCl2 Weight Ratio | Stress at Failure (kPa) |
| --- | --- | --- | --- |
| Ex. 3 | 2.12:1 | 2.84:1 | 90.8 |
| Ex. 4 | 2.56:1 | 2.84:1 | 71.4 |
| Ex. 5 | 2.56:1 | 3.27:1 | 221 |
| Ex. 6 | 2.96:1 | 2.84:1 | 261 |
| Ex. 7 | 3.39:1 | 2.84:1 | 345 |

As shown in Table 1, as the weight ratio of the MgO to $MgCl_2$ in the binder increased, the internal bond strength significantly increased from 90.8 kPa for Ex. 3 up to 345 kPa for Ex. 7. It is noted that Ex. 4 decreased relative to Ex. 3, however it was found that by increasing the amount of water in the binder the stress at failure went from 71.5 kPa to 221 kPa. It was surprising and unexpected to discover that the stress at failure increased as the weight ratio of MgO to $MgCl_2$ increased from Ex. 3 to Examples. 5 and 6. Ex. 3 had a molar ratio of $MgO:MgCl_2:H_2O$ of 5:1:15, whereas Ex. 7 had a molar ratio of $MgO:MgCl_2:H_2O$ of 8:1:15. Such results were not expected based on the general understanding that a molar ratio of $MgO:MgCl_2$ of 5:1 produces a binder that exhibits the greatest strength when used to bond cellulosic substrates. Without wishing to be bound by theory, it is believed that the stress at failure can be further increased by further increasing the weight ratio of magnesium oxide to magnesium chloride and/or adjusting the weight ratio of water to magnesium chloride.

Example 4—Internal Bond Strength

An oriented strand board was made the same way as in Example 2. Eight pieces (Examples 8-15) that had a size of about 5 cm (about 2 inches) by about 5 cm (about 2 inches) by about 1.3 cm (about 0.5 inches) were cut from the oriented strand board and were tested for internal bond strength according to ASTM D1037-99. The internal bond strengths are provided in Table 2 below.

TABLE 2

| Example | Peak Stress (kPa) |
| --- | --- |
| 8 | 575 |
| 9 | failed |
| 10 | 447 |
| 11 | 717 |
| 12 | 513 |
| 13 | 486 |
| 14 | 561 |
| 15 | 578 |
| Average | 554 |

The present disclosure further relates to any one or more of the following numbered embodiments:

1. A composite cellulosic product, comprising: a plurality of cellulosic substrates and an at least partially cured binder, wherein, prior to curing, the binder comprises a mixture formed by combining: magnesium oxide, water, and magnesium chloride, wherein a weight ratio of the magnesium oxide to the magnesium chloride in the binder is at least 0.8:1 or at least 2.2:1 to about 8.5:1.

2. A process for making a composite cellulosic product, comprising: contacting a plurality of cellulosic substrates with a binder to produce a mixture, wherein the binder comprises: magnesium oxide, water, and magnesium chloride, wherein a weight ratio of the magnesium oxide to the magnesium chloride in the binder is at least 0.8:1 or at least 2.2:1 to 8.5:1; and allowing the mixture to set for a time period sufficient to allow the binder to at least partially cure to produce the composite cellulosic product.

3. The composite cellulosic product or process of paragraph 1 or paragraph 2, wherein the weight ratio of the magnesium oxide to the magnesium chloride in the binder is at least 2.5:1 to about 6.5:1.

4. The composite cellulosic product or process of any one of paragraphs 1 to 3, wherein, prior to curing the binder, a weight ratio of the water to the magnesium chloride is about 1.5:1 to about 3.5:1.

5. The composite cellulosic product or process of any one of paragraphs 1 to 3, wherein at least a portion of the magnesium chloride is in the form of a hydrate of magnesium chloride prior to combining with the magnesium oxide and the water.

6. The composite cellulosic product or process of paragraph 5, wherein, prior to curing the binder, a weight ratio of the water to the magnesium chloride is about 1.5:1 to about 3.5:1, and wherein the amount of water includes the water present in the hydrate of magnesium chloride.

7. The composite cellulosic product or process of paragraph 5 or paragraph 6, wherein the hydrate of magnesium chloride comprises magnesium chloride hexahydrate.

8. The composite cellulosic product or process of any one of paragraphs 1 to 7, wherein, prior to curing the binder, the binder further comprises calcium chloride.

9. The composite cellulosic product or process of any one of paragraphs 1 to 8, wherein, prior to curing the binder, the binder further comprises sodium chloride.

10. The composite cellulosic product or process of any one of paragraphs 1 to 9, wherein, prior to curing the binder, the binder further comprises potassium chloride.

11. The composite cellulosic product or process of any one of paragraphs 1 to 10, wherein, prior to curing the binder, the binder further comprises at least two of calcium chloride, sodium chloride, and potassium chloride.

12. The composite cellulosic product or process of any one of paragraphs 1 to 11, wherein prior to curing the binder, the binder further comprises calcium chloride, sodium chloride, and potassium chloride.

13. The composite cellulosic product or process of any one of paragraphs 1 to 12, wherein the composite product comprises about 1 wt % to about 97 wt % of the plurality of cellulosic substrates, based on the total weight of the composite product.

14. The composite cellulosic product or process of any one of paragraphs 1 to 13, wherein the composite product is an oriented strand board, and wherein the composite product satisfies the Standard Test Method for Extended Duration Surface Burning Characteristics of Building Materials (30 min Tunnel Test) according to ASTM E2768-11(2018).

15. The composite cellulosic product or process of any one of paragraphs 1 to 14, wherein the composite product is an oriented strand board, and wherein the composite product satisfies the Standard Test Method for Fire Tests of Building Construction and Materials according to ASTM E119-20.

16. The composite cellulosic product or process of any one of paragraphs 1 to 15, wherein, prior to curing the binder, an amount of cellulosic substrates contacted with the binder is about 1 wt % to about 94 wt %, based on a combined weight of the binder and the plurality of cellulosic substrates.

17. The composite cellulosic product or process of any one of paragraphs 1 to 16, wherein, prior to curing the binder, the binder further comprises sodium polyacrylate, chitosan, magnesium (poly)acrylate, polyacrylamide, polydiallyldimethylammonium chloride, polyacrylic acid, poly(acrylamide-co-diallyldimethylammonium chloride), or a mixture thereof.

18. The composite cellulosic product or process of any one of paragraphs 1 to 17, wherein, prior to curing the binder, the binder further comprises (i) at least one of: sodium polyacrylate, magnesium (poly)acrylate, and polydiallyldimethylammonium chloride, and (ii) at least one of chitosan, polyacrylic acid, and polyacrylamide.

19. The composite cellulosic product or process of any one of paragraphs 1 to 18, wherein, prior to curing the binder, the binder further comprises sodium polyacrylate and chitosan.

20. The composite cellulosic product of any one of paragraphs 1 to 18, wherein, prior to curing the binder, the binder further comprises about 1 wt % to about 20 wt % of sodium polyacrylate based on the total amount of magnesium oxide in the binder and about 0.05 wt % to about 20 wt % of chitosan based on the combined weight of the magnesium oxide, the magnesium chloride, and the water in the binder.

21. The composite cellulosic product or process of any one of paragraphs 1 to 20, wherein, prior to curing the binder, the binder further comprises magnesium (poly)acrylate and polyacrylamide.

22. The composite cellulosic product or process of any one of paragraphs 1 to 20, wherein, prior to curing the binder, the binder further comprises about 0.25 wt % to about 20 wt % of magnesium (poly)acrylate based on the total amount of magnesium oxide in the binder and about 0.05 wt % to about 20 wt % of polyacrylamide based on the combined weight of the magnesium oxide, the magnesium chloride, and the water in the binder.

23. The composite cellulosic product or process of any one of paragraphs 1 to 22, wherein, prior to curing the binder, the binder further comprises magnesium (poly)acrylate and chitosan.

24. The composite cellulosic product or process of any one of paragraphs 1 to 22, wherein, prior to curing the binder, the binder further comprises about 0.25 wt % to about 20 wt % of magnesium (poly)acrylate based on the total amount of magnesium oxide in the binder and about 0.05 wt % to about 20 wt % of chitosan based on the combined weight of the magnesium oxide, the magnesium chloride, and the water in the binder.

25. The composite cellulosic product or process of any one of paragraphs 1 to 24, wherein, prior to curing the binder, the binder further comprises polydiallyldimethylammonium chloride.

26. The composite cellulosic product or process of any one of paragraphs 1 to 24, wherein, prior to curing the binder, the binder further comprises about 1 wt % to about 20 wt % or polydiallyldimethylammonium chloride based on the total amount of magnesium chloride in the binder.

27. The composite cellulosic product or process of any one of paragraphs 1 to 26, wherein, prior to curing the binder, the binder further comprises polydiallyldimethylammonium chloride and chitosan.

28. The composite cellulosic product or process of any one of paragraphs 1 to 26, wherein, prior to curing the binder, the binder further comprises about 1 wt % to about 20 wt % of polydiallyldimethylammonium chloride based on the total amount of magnesium chloride in the binder and about 0.05 wt % to about 20 wt % of chitosan based on the combined weight of the magnesium oxide, the magnesium chloride, and the water in the binder.

29. The composite cellulosic product or process of any one of paragraphs 1 to 28, wherein, prior to curing the binder, the binder further comprises polydiallyldimethylammonium chloride and polyacrylic acid.

30. The composite cellulosic product or process of any one of paragraphs 1 to 28, wherein, prior to curing the binder, the binder further comprises about 1 wt % to about 20 wt % of polydiallyldimethylammonium chloride based on the total amount of magnesium chloride in the binder and about 0.05 wt % to about 20 wt % of polyacrylic acid based on the combined weight of the magnesium oxide, the magnesium chloride, and the water in the binder.

31. The composite cellulosic product or process of any one of paragraphs 1 to 30, wherein, prior to curing the binder, the binder further comprises poly(acrylamide-co-diallyldimethylammonium chloride).

32. The composite cellulosic product or process of any one of paragraphs 1 to 30, wherein, prior to curing the binder, the binder further comprises about 0.05 wt % to about 20 wt % of poly(acrylamide-co-diallyldimethylammonium chloride) based on the combined weight of the magnesium oxide, the magnesium chloride, and the water in the binder.

33. The composite cellulosic product or process of any one of paragraphs 1 to 32, wherein, prior to curing the binder, the binder further comprises poly(acrylamide-co-diallyldimethylammonium chloride) and sodium polyacrylate.

34. The composite cellulosic product or process of any one of paragraphs 1 to 32, wherein, prior to curing the binder, the binder further comprises about 0.05 wt % to about 20 wt % of poly(acrylamide-co-diallyldimethylammonium chloride) based on the combined weight of the magnesium oxide, the magnesium chloride, and the water in the binder and about 1 wt % to about 20 wt % of sodium polyacrylate based on the total amount of magnesium oxide in the binder.

35. The composite cellulosic product or process of any one of paragraphs 1 to 34, wherein, prior to curing the binder, the binder further comprises polydiallyldimethylammonium chloride and sodium polyacrylate.

36. The composite cellulosic product or process of any one of paragraphs 1 to 34, wherein, prior to curing the binder, the binder further comprises about 1 wt % to about 20 wt % of polydiallyldimethylammonium chloride based on the total amount of magnesium chloride in the binder and about 1 wt % to about 20 wt % of sodium polyacrylate based on the total amount of magnesium oxide in the binder.

37. The composite cellulosic product or process of any one of paragraphs 1 to 36, wherein, prior to curing the binder, the binder further comprises polydiallyldimethylammonium chloride, sodium polyacrylate, and chitosan.

38. The composite cellulosic product or process of any one of paragraphs 1 to 36, wherein, prior to curing the binder, the binder further comprises about 1 wt % to about 20 wt % of polydiallyldimethylammonium chloride based on the total amount of magnesium chloride in the binder, about 1 wt % to about 20 wt % of sodium polyacrylate based on the total amount of magnesium oxide in the binder, and about 0.05 wt % to about 20 wt % of chitosan based on the combined weight of magnesium oxide, the magnesium chloride, and the water in the binder.

39. The composite cellulosic product or process of any one of paragraphs 1 to 38, wherein, prior to curing the binder, the binder comprises about 7.5 wt % to about 41 wt % of chlorine, based on the combined weight of the magnesium oxide and the magnesium chloride.

40. The composite cellulosic product or process of any one of paragraphs 1 to 39, wherein, prior to curing the binder, the binder comprises less than 23 wt %, less 22 wt %, less than 21 wt %, less than 20 wt %, less than 19 wt %, less than 18 wt %, or less than 17 wt % of chlorine, based on the combined weight of the magnesium oxide and the magnesium chloride.

41. The composite cellulosic product or process of any one of paragraphs 1 to 40, wherein the composite product is an oriented strand board, and wherein the composite product satisfies the Class A requirements according to the Standard Test Method for Extended Duration Surface Burning Characteristics of Building Materials (30 min Tunnel Test) according to ASTM E2768-11(2018).

42. The process of any one of paragraphs 2 to 41, wherein the press is a mold such that the mixture is located within an internal volume of the mold.

43. The process of any one of paragraphs 2 to 42, wherein the time period is from about 15 minutes to about 7 days.

44. The process of any one of paragraphs 2 to 43, further comprising a pressure to the mixture during at least a portion of the time period the mixture is allowed to set to produce the composite cellulosic product, wherein the pressure applied to the mixture is from about 950 kPa to about 4,500 kPa.

45. The process of any one of paragraphs 2 to 44, further comprising heating the mixture during at least a portion of the time period the mixture is allowed to set to produce the composite product, wherein the mixture is heated to a temperature greater than room temperature up to 400° C.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While certain preferred embodiments of the present invention have been illustrated and described in detail above, it is apparent that modifications and adaptations thereof will occur to those having ordinary skill in the art. It should be, therefore, expressly understood that such modifications and adaptations may be devised without departing from the basic scope thereof, and the scope thereof can be determined by the claims that follow.

What is claimed is:

1. A composite cellulosic product, comprising:
an at least partially cured binder and 0.5 wt % to 5 wt % of a plurality of cellulosic substrates, based on a total weight of the composite cellulosic product, wherein the plurality of cellulosic substrates comprises cellulosic substrates derived from a lignin-containing material subjected to a lignin extraction process, and wherein, prior to curing, the binder comprises a mixture formed by combining:
magnesium oxide,
water, and
magnesium chloride, wherein a weight ratio of the magnesium oxide to the magnesium chloride in the binder is at least 2.2:1 to about 8.5:1, and wherein a weight ratio of the water to the magnesium chloride in the binder is about 1.5:1 to about 4.5:1.

2. The composite cellulosic product of claim 1, wherein the weight ratio of the magnesium oxide to the magnesium chloride in the binder is at least 2.5:1 to about 4:1.

3. The composite cellulosic product of claim 1, wherein, prior to curing, the binder further comprises at least one of calcium chloride, sodium chloride, and potassium chloride.

4. The composite cellulosic product of claim 1, wherein, prior to curing, the binder further comprises at least two of calcium chloride, sodium chloride, and potassium chloride.

5. The composite cellulosic product of claim 1, wherein, prior to curing, the binder further comprises calcium chloride, sodium chloride, and potassium chloride, and wherein a combined amount of the calcium chloride, the sodium chloride, and the potassium chloride is about 3 wt % to about 30 wt %, based on a weight of the magnesium chloride present in the binder.

6. The composite cellulosic product of claim 1, wherein, prior to curing, the binder further comprises chitosan, magnesium (poly)acrylate, polydiallyldimethylammonium chloride, poly acrylic acid, poly(acrylamide-co-diallyldimethylammonium chloride), or a mixture thereof.

7. The composite cellulosic product of claim 1, wherein, prior to curing, the binder further comprises sodium polyacrylate and chitosan.

8. The composite cellulosic product of claim 1, wherein, prior to curing, the binder further comprises magnesium (poly)acrylate and at least one of polyacrylamide and chitosan.

9. The composite cellulosic product of claim 1, wherein, prior to curing, the binder further comprises polydiallyldimethylammonium chloride.

10. The composite cellulosic product of claim 1, wherein, prior to curing, the binder further comprises polydiallyldimethylammonium chloride and at least one of chitosan and polyacrylic acid.

11. The composite cellulosic product of claim 1, wherein, prior to curing, the binder further comprises poly(acrylamide-co-diallyldimethylammonium chloride) or poly(acrylamide-co-diallyldimethylammonium chloride) and sodium polyacrylate.

12. The composite cellulosic product of claim 1, wherein, prior to curing, the binder further comprises polydiallyldimethylammonium chloride and sodium polyacrylate or polydiallyldimethylammonium chloride, sodium polyacrylate, and chitosan.

13. The composite cellulosic product of claim 1, wherein the weight ratio of the water to the magnesium chloride in the binder is about 1.5:1 to about 3.8:1.

14. The composite cellulosic product of claim 1, wherein the weight ratio of the water to the magnesium chloride in the binder is less than 3.5:1.

15. The composite cellulosic product of claim 1, wherein:
the weight ratio of the magnesium oxide to the magnesium chloride in the binder is at least 3.5:1 to 4:1, and
the weight ratio of the water to the magnesium chloride in the binder is less than 3.5:1.

16. The composite cellulosic product of claim 1, wherein:
prior to curing, the binder further comprises calcium chloride, sodium chloride, and potassium chloride,
a combined amount of the calcium chloride, the sodium chloride, and the potassium chloride is about 3 wt % to about 30 wt %, based on a weight of the magnesium chloride present in the binder,
the weight ratio of the magnesium oxide to the magnesium chloride in the binder is at least 3.5:1 to 4:1,
the weight ratio of the water to the magnesium chloride in the binder is less than 3.5:1, and
the plurality of cellulosic substrates is derived from toilet paper, facial tissue, paper towels, or a combination thereof.

17. The composite cellulosic product of claim 1, wherein, prior to curing, the binder further comprises calcium chloride, sodium chloride, potassium chloride, and at least one of chitosan, magnesium (poly)acrylate, polydiallyldimethylammonium chloride, polyacrylic acid, and poly(acrylamide-co-diallyldimethylammonium chloride), and wherein a combined amount of the calcium chloride, the sodium chloride, and the potassium chloride is about 3 wt % to about 30 wt %, based on a weight of the magnesium chloride present in the binder.

18. A composite cellulosic product, comprising:
an at least partially cured binder and 0.5 wt % to 10 wt % of a plurality of cellulosic substrates, based on a total weight of the composite cellulosic product, wherein, prior to curing, the binder comprises a mixture formed by combining:
magnesium oxide,
water,
magnesium chloride,
(i) at least one of: sodium polyacrylate, magnesium (poly)acrylate, and polydiallyldimethylammonium chloride, and
(ii) at least one of chitosan, polyacrylic acid, and polyacrylamide, wherein a weight ratio of the magnesium oxide to the magnesium chloride in the binder is at least 2.2:1 to about 8.5:1, and wherein a weight ratio of the water to the magnesium chloride in the binder is about 1.5:1 to about 4.5:1.

19. The composite cellulosic product of claim 18, wherein the composite cellulosic product comprises 0.5 wt % to 5 wt % of the plurality of cellulosic substrates, based on the total weight of the composite cellulosic product, and wherein the plurality of cellulosic substrates comprises cellulosic substrates derived from a lignin-containing material subjected to a lignin extraction process.

20. A process for making a composite cellulosic product, comprising:
contacting a plurality of cellulosic substrates with a binder to produce a mixture comprising 0.5 wt % to 5 wt % of the plurality of cellulosic substrates, based on a total weight of the mixture, wherein the plurality of cellulosic substrates comprises cellulosic substrates derived from a lignin-containing material subjected to a lignin extraction process, and wherein the binder comprises:
magnesium oxide,
water, and
magnesium chloride, wherein a weight ratio of the magnesium oxide to the magnesium chloride in the binder is at least 2.2:1 to 8.5:1, and wherein a weight ratio of the water to the magnesium chloride in the binder is about 1.5:1 to about 4.5:1; and
allowing the mixture to set for a time period sufficient to allow the binder to at least partially cure to produce the composite cellulosic product.

* * * * *